(12) United States Patent
Berge et al.

(10) Patent No.: US 8,400,558 B2
(45) Date of Patent: Mar. 19, 2013

(54) IMAGE STABILIZATION CIRCUITRY FOR LIQUID LENS

(75) Inventors: Bruno Berge, Lyons (FR); Mathieu Maillard, Lyons (FR); Nicolas Verplanck, Lyons (FR)

(73) Assignee: Varioptic, S.A., Lyons (FR)

( * ) Notice: Subject to any disclaimer, the term of this patent is extended or adjusted under 35 U.S.C. 154(b) by 124 days.

(21) Appl. No.: 12/746,934

(22) PCT Filed: Dec. 12, 2008

(86) PCT No.: PCT/EP2008/067464
§ 371 (c)(1),
(2), (4) Date: Aug. 2, 2010

(87) PCT Pub. No.: WO2009/074684
PCT Pub. Date: Jun. 18, 2009

(65) Prior Publication Data
US 2010/0295987 A1    Nov. 25, 2010

(30) Foreign Application Priority Data

Dec. 13, 2007 (EP) .................................. 07301672

(51) Int. Cl.
*H04N 5/225* (2006.01)
*H04N 5/217* (2006.01)
(52) U.S. Cl. ................. 348/360; 348/340; 348/241
(58) Field of Classification Search .............. 348/340; 250/216, 208.1
See application file for complete search history.

(56) References Cited

U.S. PATENT DOCUMENTS

| 2003/0173494 A1* | 9/2003 | Nakamura | 250/201.2 |
| 2004/0227063 A1* | 11/2004 | Viinikanoja | 250/216 |
| 2004/0227838 A1* | 11/2004 | Atarashi et al. | 348/340 |

(Continued)

FOREIGN PATENT DOCUMENTS

| EP | 1 662 276 A1 | 5/2006 |
| EP | 1 906 213 A1 | 4/2008 |

(Continued)

OTHER PUBLICATIONS

International Search Report from PCT/EP2008/067464 dated Mar. 6, 2009 (4 pages).

(Continued)

*Primary Examiner* — Roberto Velez
*Assistant Examiner* — Stephen Coleman
(74) *Attorney, Agent, or Firm* — Osha Liang LLP (57) ABSTRACT

A method of controlling a liquid lens in an imaging device, the liquid lens including a liquid-liquid interface between first and second immiscible liquids deformable by electrowetting; a chamber containing the first and second liquids, the first liquid being an insulating liquid and the second liquid being a conducting liquid; and a first electrode in contact with the second liquid and at least one second electrode insulated from the second liquid by an insulating layer, the first and second electrodes being arranged to allow a plurality of voltages levels to be applied between the first and second electrodes to control the curvature of the liquid-liquid interface, the method including: determining motion data representative of a movement of the imaging device; determining focusing data representative of a desired focus of the imaging device; determining the plurality of voltage levels to be applied between the first and second electrodes, wherein each of the voltage levels is a function of the motion data, the focusing data and at least one parameter relating to the liquid lens and preliminary determined in a calibration phase.

19 Claims, 4 Drawing Sheets

U.S. PATENT DOCUMENTS

| | | |
|---|---|---|
| 2005/0002112 A1 | 1/2005 | Kroupenkine |
| 2009/0051797 A1 * | 2/2009 | Yao .............................. 348/308 |

FOREIGN PATENT DOCUMENTS

| | | | |
|---|---|---|---|
| JP | 2006-064949 A | | 3/2006 |
| JP | 2006-064949 | * | 9/2006 |
| JP | 2006064949 | * | 9/2006 |
| WO | 2006/035407 A1 | | 4/2006 |
| WO | 2006/103281 A1 | | 10/2006 |

OTHER PUBLICATIONS

Written Opinion from PCT/EP2008/067464 dated Mar. 6, 2009 (8 pages).

* cited by examiner

$$\begin{pmatrix} V_{X+} \\ V_{X-} \\ V_{Y+} \\ V_{Y-} \end{pmatrix} = \begin{pmatrix} a & b & c & \beta \\ d & e & f & \beta \\ g & h & i & \beta \\ j & k & l & \beta \end{pmatrix} \cdot \begin{pmatrix} \theta_X \\ \theta_Y \\ \sqrt{abs(\theta_X \cdot \theta_Y)} \\ Focus \end{pmatrix}$$

Fig 10

IMAGE STABILIZATION CIRCUITRY FOR LIQUID LENS

FIELD OF THE INVENTION

The present invention relates to circuitry for controlling a liquid lens, and in particular to image stabilization circuitry for a liquid lens.

BACKGROUND OF THE INVENTION

Electrowetting devices, and in particular electrowetting lenses, are known in the art, and generally comprise a refractive interface between first and second immiscible liquids that is movable by electrowetting.

Figure 1:
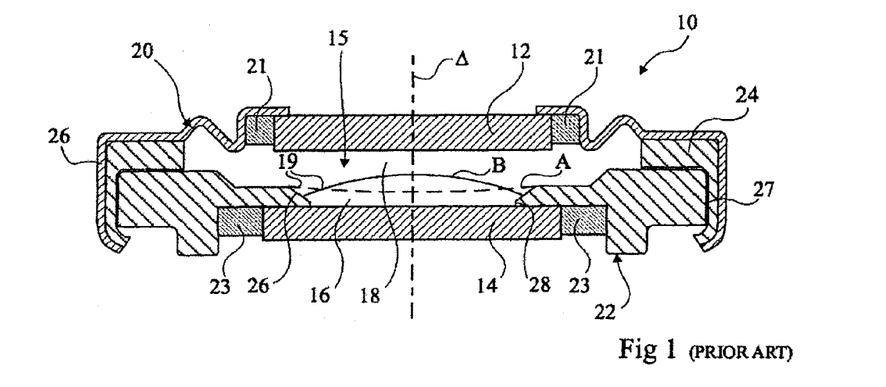
FIG. 1 (described above) is a cross-section view of a liquid lens according to the prior art.

FIG. 1 represents FIG. 4 of European Patent Application EP 1662276, and illustrates a variable focus lens 10 according to one example of the prior art. Lens 10 comprises two transparent windows 12, 14, arranged in parallel and facing each other, and delimiting, in part, an internal volume containing two immiscible liquids 16, 18, with different optical indices. Where the two liquids meet they form an optical interface 19 in the form of a meniscus, which can have a number of different shapes, examples being shown by lines A and B. The liquids 16, 18 have substantially equal densities, and one is preferably an insulating liquid, for example comprising oil and/or an oily substance, and the other is preferably a conductive liquid comprising for example an aqueous solution.

Windows 12, 14 are preferably transparent plates formed of an optical transparent material such as glass.

The structure of the lens 10 that contains the liquids comprises a cap 20 to which transparent window 12 is fixed, for example by glue 21, and a body 22 to which transparent window 14 is fixed, for example by glue 23. The cap 20 and body 22 are separated by a gasket 24. Cap 20 comprises a substantially cylindrical side wall 26, while body 22 comprises a substantially cylindrical side wall 27, and gasket 24 is positioned between the side walls 26 and 27, to ensure the tightness of the lens structure.

The cap 20 and body 22 in this example form electrodes of the lens. Cap 20 is used to provide a voltage to the conductive liquid 18. Body 22 is used to provide a voltage close to the edge of the liquid-liquid interface 19. The edge of the liquid-liquid interface 19 contacts an insulated conical surface 26 of the annular body. The parts of body 22 in contact with the liquids 16, 18, including conical surface 26, are coated with an insulating layer (not shown). The interface 19 traversed an opening in the annual body 22 through which light rays can pass.

Due to the electrowetting effect, it is possible, by applying a voltage between the cap 20 and the body 22, to change the positioning of the edge of the liquid-liquid interface on the conical surface 26, and thereby change the curvature of the refractive interface between liquids 16 and 18. For example, the interface may be changed from initial concave shape shown by dashed line A, to a convex shape as shown by solid line B. In this way, rays of light passing through the lens perpendicular to windows 12, 14 in the region of the refractive interface A, B will be focused more or less depending on the voltage applied between the cap 20 and body 22.

To avoid unwanted blurring of images captured by digital cameras caused by camera shake, image stabilization techniques can be used. This can be achieved by sensing the motion of the camera, and tilting one or more lenses in the camera to counteract this movement. It has been proposed to provide an electrowetting lens similar to lens 10 in which the tilt of the interface between the liquids in the lens is controlled by electrowetting by applying different voltages to one side of the lens than the other, the voltages for example being applied to a segmented electrode.

In many applications, variable focus and image stabilization are desired at the same time. While separate liquid lenses could be used for each of these functions, such a solution is disadvantageous due to its size. There is thus a need in the art for a solution that would allow both of these functions to be achieved by a single liquid lens.

SUMMARY OF THE INVENTION

It is an aim of embodiments of the present invention to provide a lens that at least partially address one or more the prior art.

According to one aspect of the present invention, there is provided a method of controlling a liquid lens in an imaging device, the liquid lens comprising: a liquid-liquid interface between first and second immiscible liquids deformable by electrowetting; a chamber containing the first and second liquids, the first liquid being an insulating liquid and the second liquid being a conducting liquid; and a first electrode in contact with the second liquid and at least one second electrode insulated from the second liquid by an insulating layer, the first and second electrodes being arranged to allow a plurality of voltages levels to be applied between the first and second electrodes to control the shape of the liquid-liquid interface, the method comprising: determining motion data representative of a movement of the imaging device; determining focusing data representative of a desired focus of the imaging device; determining the plurality of voltage levels to be applied between the first and second electrodes, wherein each of the voltage levels is a function of the motion data, the focusing data and at least one parameter relating to the liquid lens and preliminary determined in a calibration phase.

According to an embodiment of the present invention, the step of determining the plurality of voltage levels comprises calculating each of the voltages levels based on the product of the motion data and a first parameter relating to the liquid lens and preliminary determined in a calibration phase and the product of the focusing data and a second parameter relating to the liquid lens and preliminary determined in a calibration phase.

According to another embodiment of the present invention, the motion data comprises first and second values indicating a shift in first and second dimensions respectively of an image formed on an image sensor of the imaging device, and wherein determining the plurality of voltage levels comprises determining at least one of the voltage levels based on both of the first and second values.

According to another embodiment of the present invention, determining the plurality of voltage levels comprises determining at least one of the voltage levels based on a function having a term dependent on the product of the first and second value of the motion data.

According to another embodiment of the present invention, the function is a square root function.

According to another embodiment of the present invention, the motion data comprises at least one value indicating a shift in a first dimension of an image formed on an image sensor of the imaging device, the at least one value further indicating whether the shift is in a first direction or a second direction opposite to the first direction, and wherein determining the plurality of voltage levels comprises multiplying the at least one value by a first constant if the shift is in the first direction, and multiplying the at least one value by a second constant if the shift is in the second direction.

According to another embodiment of the present invention, determining the plurality of voltage levels comprises determining at least one of the voltage levels based on a function having a term comprising the product of the motion data and the focusing data.

According to another embodiment of the present invention, determining the plurality of voltage levels comprises calculating the voltage values based on astigmatism data indicating a level of astigmatism to be applied to the lens.

According to another aspect of the present invention, there is provided an imaging device comprising: a liquid lens comprising: a liquid-liquid interface between first and second immiscible liquids deformable by electrowetting; a chamber containing the first and second liquids, the first liquid being an insulating liquid and the second liquid being a conducting liquid; and at least one first electrode in contact with the second liquid and at least one second electrode insulated from the second liquid by an insulating layer, the first and second electrodes being arranged to allow a plurality of voltages levels to be applied between the first and second electrodes to control the shape of the liquid-liquid interface; a processor arranged to receive motion data representative of a motion of the imaging device and focusing data representative of a desired focus of the imaging device, and to determining the plurality of voltage levels based on the motion data, the focusing data and at least one parameter relating to the liquid lens and preliminary determined in a calibration phase; and a drive circuitry arranged to apply the determined plurality of voltage levels between the first and second electrodes.

According to an embodiment of the present invention, the liquid lens comprises a plurality of second electrodes, each of the plurality of voltage levels being applied between the first electrode and one of the plurality of second electrodes.

According to another embodiment of the present invention, the motion data comprises first and second values indicating a shift in first and second dimensions respectively of an image formed on an image sensor of the imaging device, and wherein determining the plurality of voltage levels comprises determining at least one of the voltage levels based on the first and second values.

According to another embodiment of the present invention, determining the plurality of voltage levels comprises determining at least one of the voltage levels based on a function having a term dependent on the product of the first value and second values of the motion data.

According to another embodiment of the present invention, the function is a square root function.

According to another embodiment of the present invention, determining the plurality of voltage levels comprises determining at least one of the voltage levels based on a function having a term dependent on the product of the motion data and the focusing data.

According to another embodiment of the present invention, the second electrode comprises an annular body formed of a material having a conductivity in the range $10^4$ to $10^7$ Ohm·cm.

According to another embodiment of the present invention, the at least one parameter is preliminary determined in a calibration phase comprising successive steps of varying the plurality of voltages until a determined focus is achieved; applying a voltage change to at least one of the plurality of voltage levels to cause a change in tilt of the liquid-liquid interface in a first direction; varying at least one of the plurality of voltage levels to cause a change of the shape of the liquid-liquid interface until the determined focus is achieved again and until an astigmatism lower to a given value is achieved; and measuring the extent of the tilt to determine the at least one predetermined parameter.

According to another aspect of the present invention, there is provided a mobile telephone comprising an image sensor, a processor, a display, and the above imaging device.

According to another aspect of the present invention, there is provided a digital camera comprising an image sensor, a processor, and the above imaging device.

According to another aspect of the present invention, there is provided a method of calibrating the above imaging device comprising the successive steps of varying the plurality of voltages until a determined focus is achieved; applying a voltage change to a first one of the plurality of voltage levels applied at a first side of the liquid-liquid interface to cause a change in tilt of the liquid-liquid interface in a first direction; varying a second one of the plurality of voltage levels applied to a second side of the liquid-liquid interface opposite to the first side to cause a change in tilt of the liquid-liquid interface in the first direction until the determined focus is achieved again; and measuring the extent of the tilt to determine the at least one predetermined parameter.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which.

DETAILED DESCRIPTION OF THE INVENTION

Figure 2:
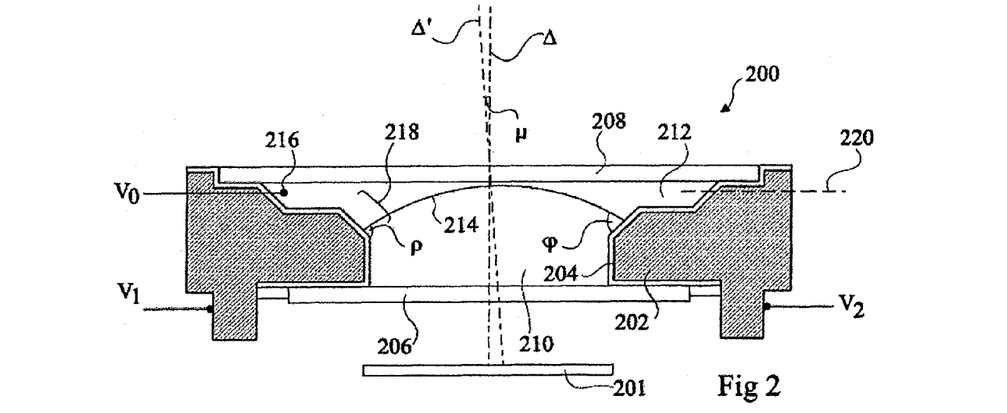
FIG. 2 is a cross-section view of a liquid lens capable of variable focus and tilt according to an embodiment of the present invention.

FIG. 2 is a cross-section view schematically illustrating a liquid lens 200, and showing how a tilt and focus can be achieved by application of different voltages V1 and V2 to an electrode 202.

Liquid lens 200 is mounted over an image sensor 201, for example with one or more fixed lenses positioned between the liquid lens 200 and the image sensor (fixed lenses not shown in FIG. 2). Lens 200 comprises an annular body 202, having an insulating layer 204 covering its inner surfaces, such that it is insulated from the liquids in the lens. Transparent windows 206, 208 are glued to an underside and a top side respectively of the annular body 202, sealing an insulating liquid 210 and a conducting liquid 212 in the lens. These liquids have different refractive indices, and form an optical interface 214 in the form of a meniscus where they meet.

The annular body 202 either comprises a segmented electrode or a resistive body, such that when two different voltages V1 and V2 are applied to opposite sides of the annular body, different voltages are generated close to the edge of interface 214 on each side of the lens, causing the liquid interface to tilt. The voltages are applied between the annular body 202 and an electrode 216 contacting the conducting liquid. A liquid lens with resistive body is for example discussed in more detail in co-pending European Application 07301180.1, in the name of the present applicant.

The example is shown in which voltage V1 applied to the left-hand side of the body 202 is higher than voltage V2 applied to the right-hand side of the body. As illustrated, due to the electrowetting effect, the higher voltage provided to the left-hand side causes a larger displacement of the edge of the liquid interface 214 on the left hand side of the lens than the displacement on the right-hand side. Whereas the normal optical axis Δ of refractive interface 214 extends through a central axis of the lens, perpendicular to windows 206, 208, the new optical axis Δ' of the tilted refractive interface is inclined by an angle μ to the normal optical axis Δ.

Angle μ is for example controllable in a range from 0-30° by the difference between V1 and V2. Angle μ for a given cross-section of the lens can be determined approximately as half the difference in contact angle between the edge of the liquid interface 214 with conical surface 218 of the annular body 202 in contact with the liquid interface. Assuming a contact angle ρ between interface 214 and surface 218 in the region of voltage V1, and a contact angle φ between interface 214 and surface 204 in the region of voltage V2, angle μ can be determined as approximately equal to (ρ−φ)/2. This represents the geometric tilt of a refractive interface. The effective optical tilt can be approximately determined as:

Optical Tilt=Geometric Tilt·Δn where Δn is the refractive index of insulating liquid 210 minus that of conducting liquid 212.

Focusing of the lens, in other words the power of the lens resulting from the curvature of the interface 214, is controlled at the same time as the tilt of the lens. The power of the lens is at least dependent on the average of voltages V1 and V2, whereas the tilt is at least dependent on the difference between V1 and V2. However, as will be explained in more detail below, the voltage levels to be applied to the liquid lens to achieve different levels of tilt and focus can vary due to the physical properties of the lens, and in particular small imperfections in the contact surface 218 of the annular body 202 in contact with the edge of interface 214 or transfer rate as explained below. Furthermore, focus and tilt can be interdependent.

While the lens 200 has been described as being controlled by different voltages applied to the annular body, in alternative embodiments, only one voltage could be applied to the body, and additional electrodes, such as electrode 220 illustrated by a dashed line in FIG. 2, could be added to make contact with the liquid 212. In this case, liquid 212 is preferably partially resistive, such that a voltage gradient is present in liquid. Such an embodiment is discussed in more detail in co-pending European Application no. 06301000.3 in the name of the present applicant.

In the case of a resistive body or the use of a resistive liquid 212, the voltage is not always applied very close to the inner edge 218 of the annular body. Since the voltage difference applied to the plurality of contacts induces a voltage gradient within the resistive body or resistive liquid, the effective voltage at the inner edge 218 will be reduced versions of the applied voltages, depending on the distance between inner edge 218 and the contacts. Therefore, there is also a transfer rate between the applied voltage and the effective voltage. Such a transfer rate should also be taken into account when determining the levels of voltages to be applied in order to get a desired value of tilt and focus.

Figure 3A:
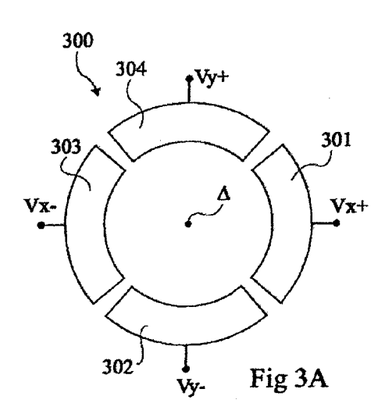
FIG. 3A is a plan view of a segmented electrode according to one embodiment.

FIG. 3A illustrates in plan view an electrode 300 of the lens, for example forming part of the annular body of the liquid lens, or being in contact with the conducting liquid of the lens. In particular, FIG. 3A shows a segmented electrode in the form of an annular disc divided equally into four segments 301 to 304, each segment being separated from the next by a gap. Segments 301 to 304 receive respective voltages Vx+, Vy−, Vx− and Vy+.

Figure 3B:
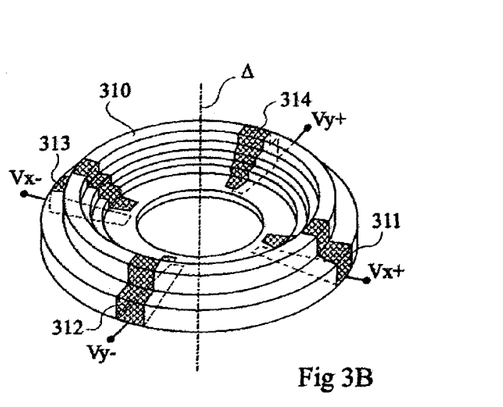
FIG. 3B is a plan view of a resistive electrode according to one embodiment.

FIG. 3B is in an elevated view of the underside of a resistive annular body 310 forming an electrode of the lens, and for example having a relatively low conductance when compared to the segments of FIG. 3A. The annular body 310 is for example formed of a moulded polymer material, such as a liquid crystal polymer, having a conductivity in the range $10^4$ to $10^7$ Ohm·cm. Four contacts 311 to 314 are provided on the surface of the annular body 310, for example formed of a metal having a relatively high conductivity such as copper. These contacts are provided in the form of four conductive tracks equally spaced around the annular body. As illustrated, each track extends, on the top and bottom sides of the annular body, radially inwardly from the outer edge of the body 310 to points close to the inner edge of the annular body. Voltages Vx+, Vy−, Vx− and Vy+ are applied to the contacts 311 to 314 respectively, such that when Vx+, Vy−, Vx− and Vy+ are different from each other, corresponding different voltage levels are present at the inner edge of the annular body.

In the following, circuitry for generating voltages Vx+, Vy−, Vx− and Vy+ for application to the electrodes/contacts of FIG. 3A or 3B will be described. It will be apparent that this circuitry could be extended to provide more than four voltages in cases in which more than four electrodes/contacts are provided. For example a total of six, eight or twelve electrodes/contacts and corresponding voltages could be provided, allowing a finer control of the liquid interface.

Figure 4:
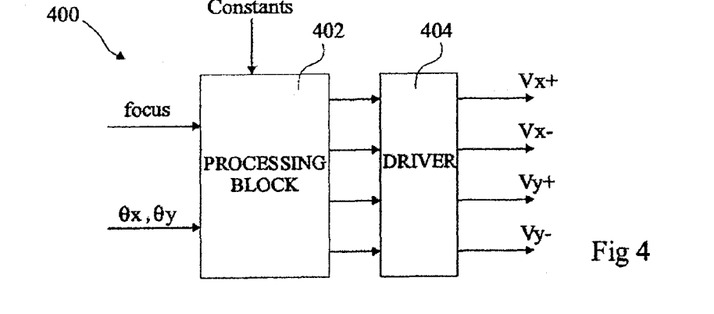
FIG. 4 illustrates schematically control circuitry for generating voltages for driving a liquid lens according to a first embodiment of the present invention.

FIG. 4 illustrates control circuitry 400 of an imaging device comprising a processing block 402, which receives a focus signal indicating a desired focus of the liquid lens, and inputs θx and θy indicating a movement of the imaging device. Based on these inputs and a number of constants, for example stored in memory, block 402 generates signals for controlling the voltage levels to each of the electrode contacts of the liquid lens to provide image stabilization, counteracting the detected movement of the lens, at the same time as focusing, based on the focusing signal. In this example there are four electrode contacts and therefore four output signals from processing block 402.

The outputs of block 402 are provided to a driver 404 which generates the drive voltages to each of the electrode contacts of the liquid lens, based on the control signals from processing block 402. The driver outputs voltages Vx+, Vx−, Vy+ and Vy−. These voltage levels for example correspond to amplitude levels of the voltage signal, which could be oscillating or fixed voltages. Alternatively, the voltage levels could be RMS values of oscillating voltages having fixed amplitudes.

Figure 5:
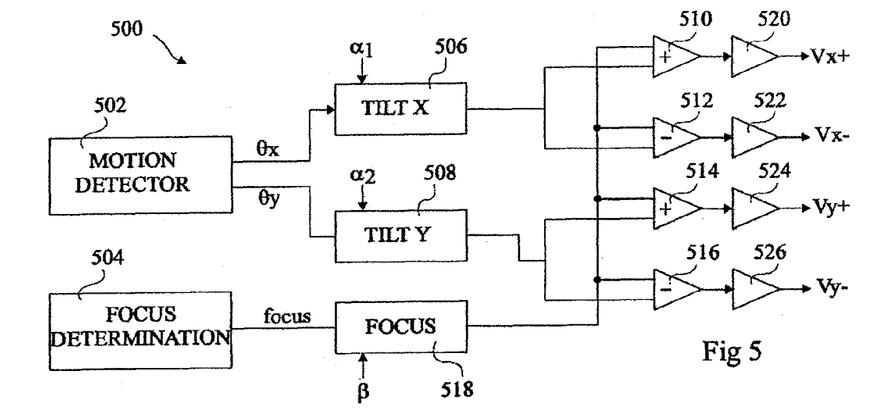
FIG. 5 illustrates schematically circuitry for generating voltages for driving a liquid lens according to another embodiment of the present invention.

FIG. 5 illustrates circuitry 500 for generating the voltages Vx+, Vx−, Vy+ and Vy− according to one embodiment. Circuitry 500 comprises a motion detector 502, and a focus determination block 504. Motion detector 502 generates an indication the pitch and yaw of an imaging device. Yaw is rotation of the imaging device around a vertical axis such the field of view moves to one side or the other, and will be referred to herein as θx. Pitch is the rotation of the imaging device around a horizontal axis such that the field of view moves upwards or downwards, and will be referred to herein as θy. The motion detector for example comprises a gyroscope sensor or an accelerometer for detecting and outputting θx and θy, or alternatively uses image analysis of the image or part of the image formed on the image sensor. Herein, θx and θy are values that are equal to zero if no yaw or pitch respectively is present, and have a positive value to represent pitch or yaw in one direction, and a negative value to represent pitch or yaw in the opposite direction. The values of θx provide the tilt to be generated using Vx+ and Vx−, and for example if θx is positive, Vx+ is higher than Vx−, and vice versa. Likewise, the values of θy provide the tilt to be generated using Vy+ and Vy−, and for example if θy is positive, Vy+ is higher than Vy−, and vice versa.

The focus determination block 504 for example determines a focus signal based on a manual control made by the user of the imaging device, or automatically, for example using an autofocus sensor, or based on image analysis of the image or part of the image formed on the image sensor. Focus determination block outputs a focus signal representative of the desired focus.

The θx and θy outputs of the motion detector are provided to a tilt x block 506 and a tilt y block 508 respectively, and these blocks each generate voltage levels based on values θx and θy multiplied by respective constants α1 and α2. The output of block 506 is provided to one of two inputs of an adder 510, and to the subtrahend input of a subtractor 512. The output of block 508 is provided to one of two inputs of an adder 514, and to the subtrahend input of a subtractor 516.

The focus output from the focus determination block is provided to a focus block 518, which generates a voltage signal based on a multiplication of the focus output by a constant β. In some embodiments, the focus signal is a relatively low voltage representing a required voltage, for example in a range 0 to 2 V, and β has a relatively high value for example of between 25 and 50 to generate the desired voltage level. Alternatively, the focus signal could be a voltage level already amplified to be close to the final voltage level to be applied to the lens, and the value of β is close to 1, providing small variations in the voltage.

The output of focus block 518 is provided to the second input of adders 510, 514, and to the minuend input of adders 512, 516. The outputs of adder 510 and subtractor 512 are amplified by respective amplifiers 520 and 522 to provide output voltages Vx+ and Vx− respectively, which are applied to opposite sides of the liquid lens to generate tilt of the liquid interface to counteract yaw. Adder 514 and subtractor 516 are amplified by respective amplifiers 524 and 526 to provide output voltages Vy+ and Vy− respectively, which are applied to opposite sides of the liquid lens to counteract pitch.

As will be appreciated by those skilled in the art, the orientation of the electrodes/electrode contacts for voltages Vx+, Vx−, Vy+, Vy− should be arranged to correspond to the orientation of the motion sensor.

The values of constants α1, α2 and β are determined during a calibration phase, which could be performed for individual lenses or alternatively for a batch of liquid lenses manufactured at the same time. For example, calibration during the calibration phase comprises initially setting all of the voltages Vx+, Vx−, Vy+, Vy− to the same value, and varying them together, for example in 1 volt steps, until a determined focus level, for example infinity focus, is achieved by the lens. This voltage is used to determine β, which can be calculated as the determined voltage level divided by the focus signal associated with the achieved focus. Then, the level of one of the voltages, for example Vx+, is reduced by a given step, causing a loss of focus, and the opposite voltage, in this case Vx−, is increased, for example in 1 volt steps, until focus is achieved again. The level of tilt at these voltages can then be measured, and used to determine constant α1, or alternatively the process can be repeated, by reducing Vx− and increasing Vx+, the results are averaged and used to determine constant α1. In either case, α1 is determined as the average voltage change divided by the tilt signal θx associated with the measured tilt. The same process is repeated for voltages Vy+ and Vy− to give constant α2. To improve the accuracy of the constants, a number of different tests can be performed, and the results averaged.

Figure 6:
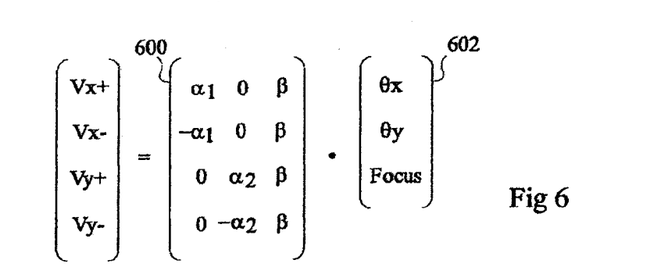
FIGS. 6 and 7 illustrate matrices used for generating voltage levels for driving a liquid lens according to embodiments of the present invention.

FIG. 6 shows a reference matrix 600 and an input matrix 602, representing calculation of voltages Vx+, Vx−, Vy+ and Vy−. Matrix 600 is a 3 by 4 matrix, and matrix 602 is a 1 by 3 matrix, and when these are multiplied, the result is a 1 by 4 matrix containing the four voltages. Matrix 600 is based on an ideal case that takes into account a homogeneous transfer rate of the body 202 of the lens 200.

Figure 7:
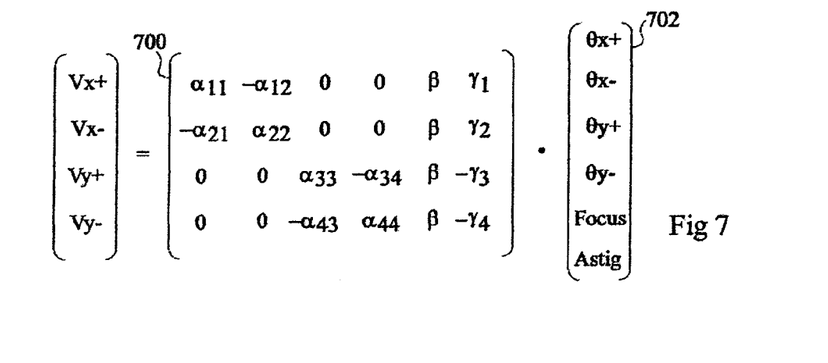

FIG. 7 shows a reference matrix 700 and an input matrix 702, representing calculation of voltages Vx+, Vx−, Vy+ and Vy− according to another embodiment in which irregularities between a tilt of the liquid interface in one direction and a tilt of the liquid interface in the opposite direction can be taken into account. In particular, if the lens body is non-homogeneous, or non-symmetrical due, for example, to a moulding process used to form the body, the transfer rate between the desired focus or tilt and each voltage to be applied can be non-symmetrical. As an example, inducing a tilt in one direction could require different voltages than inducing a tilt in the opposite direction. The embodiment of FIG. 7 provides a solution. For this, the tilt values θx and θy are each separated into positive and negative components θx+, θx− and θy+, θy− respectively. As explained above, θx and θy are positive if tilt is in a first direction, and negative if tilt is in the opposite direction, and θx+ and θy+ provide the tilt values if tilt is in the first direction, while θx− and θy− are zero, and θx− and θy− provide the tilt values if tilt is in the opposite direction, while θx+ and θy+ are zero.

The values θx+ and θx− are multiplied by respective constants α11 and −α12 for calculation of Vx+, and by respective constants −α21 and α22 for calculation of Vx−. Given that one of θx+ and θx− is always zero, one of these multiplications will always result in zero. The values θy+ and θy− are multiplied by respective constants α33 and −α34 for calculation of Vy+, and by respective constants −α43 and α44 for calculation of Vy−. Again, given that one of θy+ and θy− is always zero, one of these multiplications will always result in zero.

In this embodiment, a further set of constants γ1 to γ4 are used, multiplied by an astigmatism signal Astig to be applied to the lens. Astigmatism in a liquid lens can be controlled by applying a higher voltage to two opposing electrodes than is applied to the other two opposing electrodes. Astigmatism is characterized by a difference of curvature radii of the interface in two perpendicular directions. In image stabilization applications, astigmatism is an optical aberration that should generally be minimized. In embodiments described herein comprising four contacts/electrodes arranged at 90 degree spacing, astigmatism is likely to be the predominant non-spherical deformation of the liquid interface.

Generally zero astigmatism is desired, and in some embodiments the Astig signal can be used to reduce astigmatism to zero. Alternatively, it is used to generate a desired deformation, which can be of use in some optical applications. In the embodiment of FIG. 7, a voltage adjustment of Astig.γ1 is added in Vx+, Astig.γ2 is added in Vx−, Astig.γ3 is subtracted in Vy+, and Astig.γ4 is subtracted in Vy−. The signal Astig is for example a signal having a positive or negative value, which is generated internally, and expresses the extent of desired deformation of the refractive interface. The constants γ1 to γ4 in some embodiments could be equal to each other, or different allowing unsymmetrical features in the lens to be taken into account. The values of constants γ1 to γ4 can be calibrated during a calibration phase of the lens, for example by applying zero tilt and a predetermined focus to the interface, and increasing the voltage applied to opposing electrodes until a desired deformation is achieved.

The constants of the reference matrix 700 of FIG. 7 are for example calibrated in a similar fashion to constants α1, α2 and β described above, although in this embodiment the results recorded from tilts in each direction are not averaged, but are used to determine the constants associated with each direction of tilt.

Figure 8A:
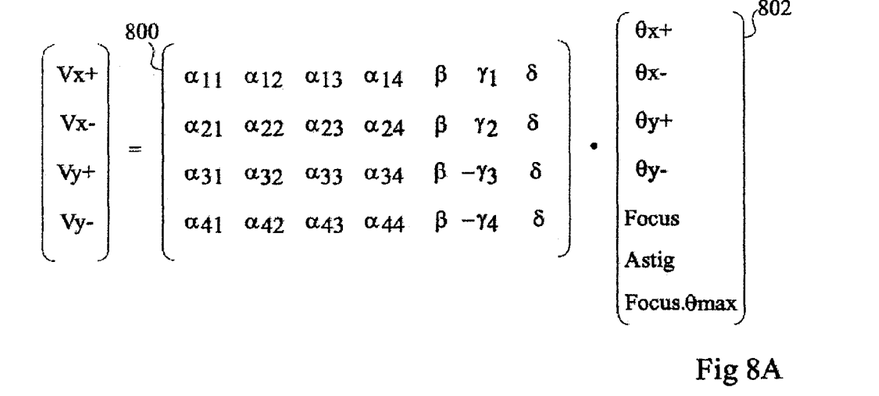
FIG. 8A illustrates matrices used for generating voltage levels for driving a liquid lens according to further embodiments of the present invention.

FIG. 8A is a matrix representing calculation of voltages Vx+, Vx−, Vy+, Vy− according a different method in which the voltages are calculated based on a term δ.focus.θmax, where δ is a constant and θmax is the highest tilt of θx+, θx−, θy+, θy−, as a positive magnitude.

By providing a term containing a multiplication of the focus and the tilt, any interdependency between tilt and focus can be taken into account. For example, in some embodiments, when a high tilt is provided, the focus of the lens is degraded, and thus a higher voltage is needed to generate the same focus from the lens than is needed for lower tilts. While different constants relating to the tilt can be provided for each direction, in some cases there is not a linear relationship between voltage and tilt for a given focus, and in this case, a term comprising both tilt and focus provides a better model.

Furthermore, according to the calculation represented by the matrix of FIG. 8A, the voltage for a particular electrode may be dependent on the tilt voltage applied to each other electrode. This allows the voltages of the lens to be better adapted for a particular tilt. For example, it is possible that if a tilt in the x direction is made by a variation between voltages Vx+ and Vx−, a better curvature of the interface can be achieved when at the same time an offset is added to the voltages Vy+ and Vy−.

Figure 8B:
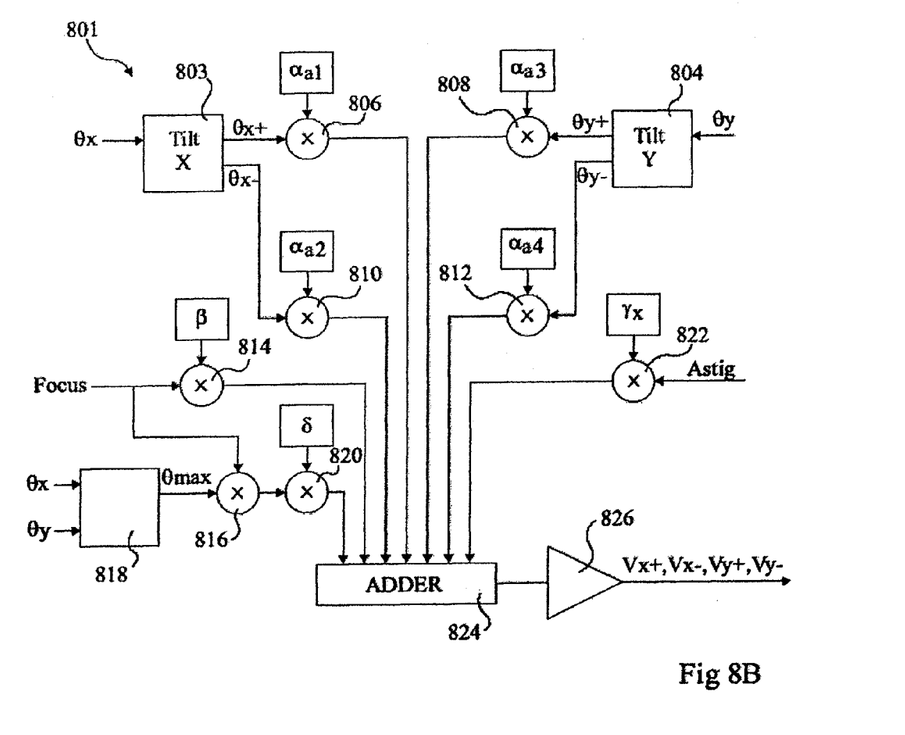
FIG. 8B illustrates schematically circuitry for generating voltages for driving a liquid lens according to a further embodiment of the present invention.

FIG. 8B schematically illustrates control circuitry 800 implementing the calculation of voltages Vx+, Vx−, Vy+, Vy− according to the method represented by the matrix of FIG. 8. The circuitry comprises a tilt x block 803, which receives θx as an input and outputs θx+ and θx−, and a tilt y block 804, which receives θy as an input and outputs θy+ and θy−. Values θx+, θx−, θy+ and θy− are provided to respective multipliers 806, 808, 810 and 812. Although for simplicity only one multiplier is illustrated in each case, each multiplier 806 to 812 performs four multiply operations, multiplying the input values by the four constants shown in the first four columns of FIG. 7. The sets of four constants are labelled αa1, αa2, αa3 and αa4, wherein α is equal to 1 to 4. Thus each multiplier generates four outputs in parallel or in series, one associated with each voltage to be generated.

At the same time, the focus value is provided to multipliers 814 and 816. At multiplier 814, focus is multiplied by constant β. At multiplier 816 focus is multiplied by θmax, which is generated by block 818 based on received values of θx and θy. The output of multiplier 816 is provided to a further multiplier 820, which multiplies it by constant δ. Also at the same time, input value Astig is provided to a multiplier 822, where four multiply operations are performed to multiply Astig by each of the constants γ1 to γ4 to generate four outputs.

The each of the four outputs from multipliers 806, 808, 810, 812 and 822, are added to the outputs of multipliers 814 and 820 by adder block 824, to generate the voltages Vx+, Vx−, Vy+, Vy− respectively, which are output by driving circuitry 826 connected to adder 824.

Determination of the constants of the matrix of FIG. 8A can be achieved during a calibration step in which more detailed analysis of the effects of changes in the voltages is observed. The values for tilt are determined in a similar fashion to the methods described above, except that, once Vx+ and Vx− have been determined for a given tilt, small variations to Vy+ and Vy− are made and image analysis performed to determine whether an improved image quality can be achieved. To determine the value of δ, determined values for the tilt signals and focus signal are for example applied and then the effect on the focus of a change to the focus signal is observed. This is repeated for a number of different values of tilt, using the same change in focus signal, and if the effect on the focus varies, this implies an interdependence between tilt and focus which can be corrected by introducing a corresponding value for δ.

Figure 9:
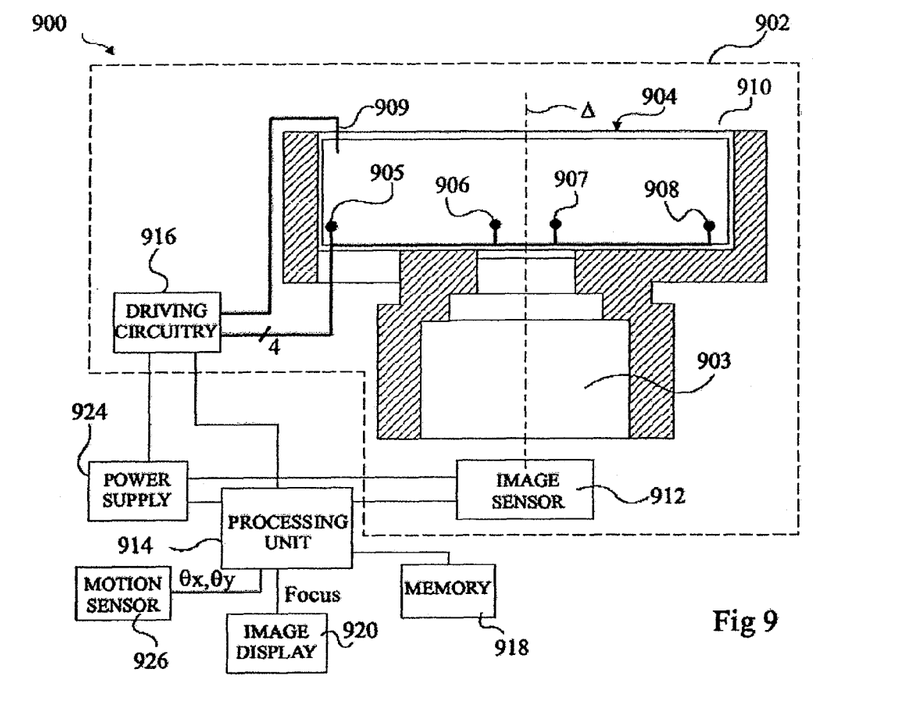
FIG. 9 is a schematic illustration of an optical apparatus according to an embodiment of the present invention.

FIG. 9 is a schematic view of an optical apparatus 900 including an optical device according to embodiments of the invention, which is for example to be used in a compact digital camera, mobile phone, or alternative electronic/optical device. Optical apparatus 900 comprises a camera module 902 comprising a lens arrangement 903 and an optical device 904 according to one of the embodiments described herein. Optical device 904 has four contacts 905 to 908 for connecting four voltages, either to separate electrodes as illustrated in FIG. 3A, or a resistive electrode as illustrated in FIG. 3B. More contacts could be provided in alternative embodiments, and more corresponding voltages could be generated. At least one further electrode 909 is provided for making contact with the conducting liquid in the lens. The lens arrangement 903 comprises a number of fixed lenses. It will be apparent that in alternative embodiments the four contacts could be connected to corresponding electrodes in contact with the conducting liquid, and a single contact made with the body of the lens.

Driving circuitry 916 is provided connected to the contacts 905 to 908 and electrode 909. The driving circuitry 916 generates oscillating voltage signals to each of the electrodes.

The driving circuitry 916 for example comprises one or more frequency oscillators for generating signals at one or more given frequencies. These signals can then be amplified before being provided between contacts 905 to 908 and electrode 909.

As described above, the voltages applied between electrode 908 and contacts 905 to 908 can have different voltage levels or RMS values. This can for example be achieved by providing a variable resistor connected in series between the voltage signal and each of the contacts on the electrodes, so that the peak to peak voltage level can be varied independently, for example from 0V to 120V. Alternatively, identical voltage signals having the same peak to peak voltage value, the same period and the same RMS voltage can be applied to the electrodes at the same time, but a variable delay can be added to the signal applied to each of the contacts. In this way, the RMS voltage can be varied anywhere between 0V, when the signals applied to electrode 909 and one of the contacts 905 to 908 are exactly in phase, and a maximum value when the voltage signals are exactly 180 degrees out of phase of 60V RMS. Such delays can for example be provided by capacitors.

As a further alternative, the RMS voltage of the signal to each of the contacts 905 to 908 can be varied by varying the duty cycle of each of these signals, while providing either 0V or a signal having a constant duty circle to the electrode 909, to give RMS voltages variable between 0 and 60 V.

In an alternative embodiment, each of the contacts 905 to 908 is supplied in turn with an AC voltage signal. The time during which the voltage signal is applied is varied for each contact so that the required voltage is applied. The time period during which each contact 905 to 908 is not connected to the AC voltage signal is preferably shorter than the response time of a liquid liquid interface so that there is no undesired movement of interface.

The camera module 902 further comprises an image sensor 912 which captures images formed from light rays received by optical device 904 and fixed lenses 903.

A processing unit 914 is provided in the optical apparatus 900, which is for example an image signal processor or a base band processor of a mobile phone. Processing unit 914 performs the calculation of the voltage levels as described above, and these values are provided to the driving circuitry 916. Processing unit 914 receives captured images from image sensor 912 and stores them in a memory 918 and/or displays them on a display 920.

A power supply unit 924 provides supply voltages to the driving circuitry 916, the image sensor 912 and the processing unit 914

In order to detect movement of the apparatus when a picture is to be taken, a motion sensor 926 is be provided, connected to the processing unit 914, which generates signals $\theta x$ and $\theta y$. In alternative embodiments, movement of the apparatus around other axis could be detected by the motion detector, and corresponding additional electrodes provided in the liquid lens to control the tilt of the lens in response to the motion. Motion sensor 926 can comprise any suitable means for detecting motion of the apparatus, such as a micro-electro-mechanical system (MEM) accelerometer, or gyroscope. Alternatively, motion can be detected by detecting movement of the images sensed by the image sensor.

In some embodiments, a calibration loop could be provided to calibrate the tilt before a picture is taken. In particular, while an image is being previewed, and before a final image is taken, motion can be detected for example using the motion sensor 926, the image can be tilted in response to account for the motion, and the image from the image sensor can be used to determine if the correct tilt was applied based on the motion. In particular, if too much or too little tilt was provided, this information can be used to recalibrate the tilt applied for a given movement for future movements, by adjusting the constants $\alpha$ described above.

Thus control circuitry has been described which advantageously allows the tilt of a liquid interface of a liquid lens to be controlled at the same time as its focus. This is achieved by generating the voltages to be applied to multiple contacts of the lens based on motion detected by a motion detector, focusing information and at least one constant. Preferably, the voltages are determined based on the product of said focusing information and a first constant, and the product of said motion and a second constant. These constants are for example determined during a calibration phase, executed at the manufacturing stage of the liquid lens, for example prior to assembly of device 902.

Figure 10:
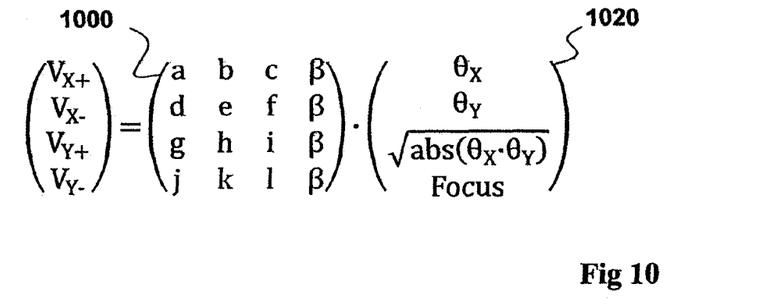
FIG. 10 illustrates matrices used for generating voltage levels for driving a liquid lens according to a further embodiment of the present invention.

FIG. 10 shows a matrices system according to another embodiment of the present invention enabling to minimize astigmatism and loss of focus.

The terms $\theta x$ and $\theta y$ of the input matrix 1020 correspond to motion data of the imaging device. The root term of matrix 1020 combining $\theta x$ and $\theta y$ motion data allows the tilt of the liquid interface to be accurately modeled, in particular when the tilt is done in both x and y directions at once, defined by the variation between voltages (Vx+, Vx−) and (Vy+, Vy−) respectively. This term enables to take into account the coupling between two adjacent electrodes, which is a crosstalk-like phenomenon that can lead to a loss of focus and/or to astigmatism.

The values of constants a to l and $\beta$ of the referenced matrix 1000 are determined during a calibration phase, which could be performed for individual lenses or alternatively for a batch of liquid lenses manufactured at the same time. For example, calibration during the calibration phase comprises initially setting all of the voltages Vx+, Vx−, Vy+, Vy− to the same value, and varying them together, for example in 1 volt steps, until a determined focus level, for example infinity focus, is achieved by the lens. The voltage of this reference point is used to determine $\beta$, which can be calculated as the determined voltage level divided by the focus signal associated with the achieved focus.

Then, the level of two voltages, for example the two opposite voltages Vx+ and Vx−, is modified: one is increased and one is reduced by a given step, causing a tilt in one direction, in this case the x direction. Unfortunately this tilt of the liquid-liquid interface can create a loss of focus and an increase of astigmatism. To reduce the loss of focus, all of the voltages Vx+, Vx−, Vy+, Vy− are increased by a given step, until focus is achieved again. In order to minimize astigmatism, in particular astigmatism along x and y directions, two opposite voltages, for example Vx+ and Vx−, are increased while the other two opposite voltages, for example Vy+ and Vy−, are decreased, until astigmatism is lower to a given value. The level of tilt at these voltages can then be measured, and used to determine a constant associated to each of the voltages Vx+, Vx−, Vy+ and Vy−. The process can be repeated, by modifying the voltage step which induces the tilt, for example Vx+ and Vx−, the results are averaged and used to determine a constant associated with each of the voltages Vx+, Vx−, Vy+ and Vy−. The process is also repeated in order to obtain tilt data and associated voltages in several directions, for example in y direction by varying Vy+ and Vy− and in an intermediate direction to x and y by increasing two adjacent voltages, for example Vx+ and Vy−, and decreasing the other two adjacent voltages Vx− and Vy+ by a given step. This allows to estimates all the constants a to l of the referenced matrix 1000. It will be apparent for the man skilled in the art that other methods than the above described example of determination of matrix 1000 can be used.

Having thus described at least one illustrative embodiment of the invention, various alterations, modifications and improvements will readily occur to those skilled in the art.

For example, it will be apparent that any of the described embodiments could be combined in any combination. For example, a system could calculate the voltage levels based on the matrix of FIG. 6, and additionally comprising astigmatism control described in relation to FIG. 7 using one or more $\gamma$ constants, or comprising a term focus.$\theta$max using a $\delta$ constant as described in relation to FIG. 8A.

Furthermore, the generation of the voltage levels to be applied to the lens could be implemented in software or hardware or a combination of both.

Furthermore, while the example of four contacts has been provided, the method could be adapted to provide a lower or greater number of voltages or a lower or greater number of contacts.

The electrowetting device and control circuitry according to the embodiments described herein could be incorporated in any optical system, for example in cameras, mobile telephones, ophthalmic tools, endoscopes, barcode readers, binoculars etc.

The invention claimed is:

1. A method of controlling a liquid lens in an imaging device, the liquid lens comprising a liquid-liquid interface between first and second immiscible liquids deformable by electrowetting, a chamber containing the first and second liquids, the first liquid being an insulating liquid and the second liquid being a conducting liquid, and a first electrode in contact with said second liquid and at least one second electrode insulated from said second liquid by an insulating layer, said first and second electrodes being arranged to allow a plurality of voltage levels to be applied between said first and second electrodes to control the shape of said liquid-liquid interface, the method comprising:
determining, using a motion detector, motion data representative of a movement of said imaging device;
determining, using a focus determination block, focusing data representative of a desired focus of said imaging device;
determining said plurality of voltage levels to be applied between said first and second electrodes; and
applying said plurality of voltage levels between said first and second electrodes,
wherein each of said plurality of applied voltage levels is a function of said motion data, said focusing data, and at least one parameter relating to the liquid lens, wherein said at least one parameter is preliminarily determined in a calibration phase.

2. The method of claim 1, wherein said step of determining said plurality of voltage levels comprises calculating each of said plurality of voltage levels based on the product of said motion data and a first parameter ($\alpha$) relating to the liquid lens, and the product of said focusing data and a second parameter ($\beta$) relating to the liquid lens, wherein said first and second parameters are preliminarily determined in the calibration phase.

3. The method of claim 1, wherein said motion data comprises first and second values indicating a shift in a first dimension and a second dimension, respectively, of an image formed on an image sensor of said imaging device, and wherein determining said plurality of voltage levels comprises determining at least one of said voltage levels based on both of said first and second values.

4. The method of claim 3, wherein determining said plurality of voltage levels comprises determining at least one of said voltage levels based on a function having a term dependent on the product of said first value and second value of said motion data.

5. The method of claim 4, wherein said function is a square root function.

6. The method of claim 1, wherein said motion data comprises at least one value indicating a shift in a first dimension of an image formed on an image sensor of said imaging device, said at least one value further indicating whether said shift is in a first direction or a second direction opposite to said first direction, and wherein determining said plurality of voltage levels comprises multiplying said at least one value by a first constant when said shift is in the first direction, and multiplying said at least one value by a second constant when said shift is in the second direction.

7. The method of claim 1, wherein determining said plurality of voltage levels comprises determining at least one of said voltage levels based on a function having a term comprising the product of said motion data and said focusing data.

8. The method of claim 1, wherein determining said plurality of voltage levels comprises calculating said voltage levels based on astigmatism data indicating a level of astigmatism to be applied to said lens.

9. The method of claim 1, wherein the at least one parameter is preliminarily determined in a calibration phase comprising the successive steps of:
varying said plurality of voltages until a determined focus is achieved;
applying a voltage change to a first one of said plurality of voltage levels applied at a first side of said liquid-liquid interface to cause a change in tilt of said liquid-liquid interface in a first direction;
varying a second one of said plurality of voltage levels applied to a second side of said liquid-liquid interface opposite to said first side to cause a change in tilt of said liquid-liquid interface in said first direction until said determined focus is achieved again; and
measuring the extent of said tilt to determine said at least one parameter.

10. An imaging device comprising:
a liquid lens comprising:
a liquid-liquid interface between first and second immiscible liquids deformable by electrowetting;
a chamber containing the first and second liquids, the first liquid being an insulating liquid and the second liquid being a conducting liquid; and
at least one first electrode in contact with said second liquid and at least one second electrode insulated from said second liquid by an insulating layer,
said first and second electrodes being arranged to allow a plurality of voltage levels to be applied between said first and second electrodes to control the shape of said liquid-liquid interface;
a motion detector for determining motion data representative of a movement of said imaging device;
a focus determination block for determining focusing data representative of a desired focus of said imaging device;
a processor arranged to receive motion data representative of a motion of said imaging device and focusing data representative of a desired focus of said imaging device, and to determine each of said plurality of voltage levels based on said motion data, said focusing data, and at least one parameter relating to said liquid lens, wherein the at least one parameter is preliminarily determined in a calibration phase; and
a drive circuitry arranged to apply said determined plurality of voltage levels between said first and second electrodes.

11. The imaging device of claim 10, wherein said liquid lens comprises a plurality of second electrodes, each of said plurality of voltage levels being applied between said first electrode and one of said plurality of second electrodes.

12. The imaging device of claim 10, wherein said motion data comprises first and second values indicating a shift in a first and a second dimensions respectively of an image formed on an image sensor of said imaging device, and wherein determining said plurality of voltage levels comprises determining at least one of said voltage levels based on said first and second values.

13. The imaging device of claim 12, wherein determining said plurality of voltage levels comprises determining at least one of said voltage levels based on a function having a term dependent on the product of said first value and second value of said motion data.

14. The imaging device of claim 13, wherein said function is a square root function.

15. The imaging device of claim 10, wherein determining said plurality of voltage levels comprises determining at least one of said voltage levels based on a function having a term dependent on the product of said motion data and said focusing data.

16. The imaging device of claim 10, wherein said second electrode comprises an annular body formed of a material having a conductivity in the range $10^4$ to $10^7$ Ohm·cm.

17. A mobile telephone comprising an image sensor, a processor, a display, and the imaging device of claim 10.

18. A digital camera comprising an image sensor, a processor, and the imaging device of claim 10.

19. The imaging device of claim 10, wherein the at least one parameter is preliminarily determined in a calibration phase comprising successive steps of:
  varying said plurality of voltages until a determined focus is achieved;
  applying a voltage change to at least one of said plurality of voltage levels to cause a change in tilt of said liquid-liquid interface in a first direction;
  varying at least one of said plurality of voltage levels to cause a change of the shape of the liquid-liquid interface until said determined focus is achieved again and until an astigmatism lower to a given value is achieved; and
  measuring the extent of said tilt to determine said at least one parameter.

* * * * *